United States Patent
De Vos et al.

(10) Patent No.: US 7,943,679 B2
(45) Date of Patent: May 17, 2011

(54) METHOD OF MOLDING RIGID POLYURETHANE FOAMS WITH ENHANCED THERMAL CONDUCTIVITY

(75) Inventors: Hans A. G. De Vos, Horgen (CH); Vanni Parenti, Campagnola (IT)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 12/093,083

(22) PCT Filed: Nov. 3, 2006

(86) PCT No.: PCT/US2006/042979
§ 371 (c)(1),
(2), (4) Date: May 8, 2008

(87) PCT Pub. No.: WO2007/058793
PCT Pub. Date: May 24, 2007

(65) Prior Publication Data
US 2008/0255262 A1    Oct. 16, 2008

Related U.S. Application Data

(60) Provisional application No. 60/736,247, filed on Nov. 14, 2005.

(51) Int. Cl.
*C08J 9/14*       (2006.01)

(52) U.S. Cl. ........ 521/131; 521/130; 521/164; 521/167; 521/170; 521/174

(58) Field of Classification Search ................ 521/130, 521/131, 164, 167, 170, 174
See application file for complete search history.

(56) References Cited

U.S. PATENT DOCUMENTS

| | | | | |
|---|---|---|---|---|
| 5,530,033 | A * | 6/1996 | Lunardon et al. | 521/131 |
| 5,736,588 | A * | 4/1998 | Eisen et al. | 521/155 |
| 6,831,110 | B2 * | 12/2004 | Ingold et al. | 521/128 |

* cited by examiner

*Primary Examiner* — John Cooney

(57) ABSTRACT

The present invention is to a molded rigid polyurethane foam for application in appliance, having a reduced thermal conductivity at densities between 33 and 38 $kg/m^3$ and a process for the production of such foams. The molded rigid polyurethane foam have a ratio of applied foam density (kg/m3) to lambda (mW/mK), measured at 10° C., 24 hours after foam production from 1.65 and to 2.15 and are obtained by the process of injecting into a closed mold cavity under reduced pressure a reaction mixture at a packing factor of 1.1 to 1.9 and the reaction mixture comprises: A) an organic polyisocyanate; B) a physical blowing agent, C) a polyol composition containing at least one polyol with a functionality of 3 or greater and a hydroxyl number between 200 and 800 and a water content of 0 to 2.5 weight percent of the total polyol composition; D) catalyst and E) auxiliary substances and/or additives.

14 Claims, No Drawings

METHOD OF MOLDING RIGID POLYURETHANE FOAMS WITH ENHANCED THERMAL CONDUCTIVITY

The present invention pertains to a molded rigid polyurethane foam for application in appliance, having a reduced thermal conductivity in combination with a reduced demould time at densities between 33 and 38 kg/m$^3$ and a process for the production of such foams.

Polyurethane foam molding are conventionally manufactured by introducing a polyurethane reactive mixture containing a blowing agent and water into a mold cavity, the blowing agent being released in the course of the polyaddition reaction between the isocyanate and isocyanate-reactive components in the mixture, causing the reactive mixture to foam and fill the cavity.

Manufacturing processes and characteristics of rigid polyurethane molded foams, including those used in appliances, are well known. See for example, Polyurethane Handbook by G. Oertel et al., 2$^{nd}$ edition, Hanser Publishers, 1993. The polyurethane foaming mixture is generally injected into the mold cavity at atmospheric pressure. Difficulties can be encountered in completely filling a mold cavity and in producing pieces which are uniform in density. To aid in the flow of material into a cavity, the reduction in the pressure of the mold cavity is proposed for specific applications, see for example U.S. Pat. Nos. 3,970,732 and 5,972,260.

As the polyurethane foam is used in appliances, it is also desirable for the foam to have good insulation properties, that is, low Lambda or low thermal conductivity. To reduce the thermal conductivity of such foams, there are numerous reports on foam formulations that improve the Lambda values. Reports on various formulations have been particularly prevalent as the industry has converted from hydrochlorocarbon based blowing agents to hydrocarbon and/or hydrofluorocarbon (HFC) blowing agents. Illustrative of the production of rigid polyurethane foams with a hydrocarbon blowing agent are EP Publications 421,269; 707,127; 805,831; 832,909; 858,477; 906,354; 991,686; 1,043,350; 1,293,524 and 1,349,883. However there are still limitations in the way these formulations can be modified to optimize both processing and foam thermal insulation. Another issue is the increase of foam Lambda over time due to gas diffusion. There is also an issue with product consistency due to variations in processing conditions, especially due to variations in barometric pressure caused by geographical and/or weather conditions, impacting the foam expansion, hence its density.

It is an object of the present invention to optimize foam formulations to produce rigid polyurethane foam having low thermal conductivity value at densities of 33 to 38 kg/m$^3$ under stable conditions. It is also an object of the present invention to adjust the mold filling time by process conditions rather than chemistry in order to optimize density distribution and esthetical foam homogeneity (reduction of voids). It is also an object of the present invention to reduce the demould time of the produced foams while minimizing their lambda.

The objectives of the present invention are achieved by injecting a polyurethane foam forming system into a mold maintained at a reduced air pressure, filling the mold and applying an overpack (that is getting a foam molded density higher than the minimum fill density). The present process also improves the processability of viscous polyol-isocyanate systems. The process conditions further allow the use of fast reacting systems based on high catalyst packaging or addition of strong amine based autocatalytic polyols. Furthermore, the foams of the present invention have good compressive strength and dimensional stability properties. The present invention accordingly provides a rigid polyurethane foam having a ratio of molded foam density (kg/m$^3$) to Lambda (mW/m.K), measured at 10° C., 24 hours after foam production, between 1.8 and 2.15, obtained by the process of injecting into a closed mold cavity a reaction mixture at a packing factor of 1.1 to 1.6 wherein the mold cavity is under a reduced pressure and the reaction mixtures comprises:

A) an organic polyisocyanate;
B) a physical blowing agent,
C) a polyol composition containing at least one polyol with a functionality of 3 or greater and a hydroxyl number between 300 and 800
D) water present at 0 to 2.5 weight percent of the total polyol formulation;
E) catalyst and
F) auxiliary substances and/or additives;

wherein the foam has a molded density of 33 to 38 kg/m$^3$.

In another embodiment, the present invention is a process for producing a molded rigid polyurethane foam as disclosed above. In a further embodiment, the present invention is an appliance containing a foam as described above.

It is surprising that a rigid polyurethane foam according to the invention would have a fast curing and low thermal conductivity at the normal densities of 33 to 38 kg/m$^3$. In addition, the favorable density and thermal conductivity properties are achieved without sacrificing performance in terms of dimensional stability, compressive strength or adhesion properties of the foam to metal or plastic liners used in the manufacture of appliance housing.

Various terms used in the text of the present invention have the following meaning:

Gel or gelation time: The gel time extends from the start of mixing to the moment from which a stick introduced into the foam draws fibers when withdrawn.

Rise time: The rise time extends from the start of mixing to the moment when foam rise is completed Tack free time: The tack free time extends from the start of mixing to the moment when foam surface does not stick to the operator finger.

Demolding time: The time between foam injection and mold opening

Polyol Composition: The total set of polyols, crosslinkers and chain extenders present that can react with isocyanate molecules.

Polyol Formulation: The polyol composition plus additives, such as catalysts, surfactant, water, excluding the physical blowing agent.

Premix: The polyol formulation plus all physical blowing agents.

System or Foam Formulation: Is the combination of premix and isocyanate component.

Free Rise Density (FRD): The density measured from a 100×100×100 mm block, obtained from the center of a free rising foam (at ambient air-pressure) produced from a total system formulation weight of 300 grams or more, FRD is reported in kg/m$^3$.

Min. Fill Density (MFD) The density determined from the minimum weight needed to fill the mold completely and the volume of this mold..MFD is reported in kg/m$^3$.

Min. Fill Weight (MFW): The minimum weight needed to fill the mold completely. MFW is reported in kg.

Moulded Density (MD): The density determined from the injected weight in the mold and the volume of this mold. MD is reported in kg/m$^3$. The measured moulded density is determined from the average of minimum 5 samples of 100×100× "thickness" in mm (including skin) by weighing the samples and dividing the weight by the measured volume of the samples.

Overpack: The overpack is defined as [injected weight*100/MFW]. Overpack is reported in percent.

Packing factor: The packing factor is defined as [moulded density/FRD]. The packing factor is reported as a unit-less number.

Pressure: Pressures can either be air pressures in the mold or foam mass pressure on mold walls. All pressures are reported in absolute pressure, with the unit mbar (or hPa). The reference pressure is 1000 mbar=1000 hPa=approx 1 atmosphere at sea level=0 bar gauge.

The process of the present invention allows for the production of a rigid polyurethane foam with thermal conductivity values lower than what is typically observed for a rigid foam having a density of 33 to 38 kg/m$^3$. Injection of an appliance foam formulation in a mold maintained at a low internal pressure gives more freedom to adjust the ratio of water to auxiliary blowing agent. The process allows for better optimization of the water ($CO_2$) to physical blowing agent ratio, especially a reduction in the level of water used in the polyol formulation. A reduction in the level of carbon dioxide as blowing agent in the foam reduces the Lamda increase over time. Additionally the water reduction in foam formulations allows for a reduction in the amount of isocyanate consumption.

In the present invention, more viscous systems either due to the type of polyols or due to the fast reactivity (increased catalysis) of the foaming mass can be processed. The present invention may also allow for a reduction in the absolute level of physical blowing agent which reduces the polyurethane formulation costs and volatile organic compound emissions upon disposal of an appliance containing such a foam.

Polyols useful in the present invention are compounds which contain two or more isocyanate reactive groups, generally active-hydrogen groups, such as —OH, primary or secondary amines, and —SH. Representative of suitable polyols are generally known and are described in such publications as *High Polymers*, Vol. XVI; "Polyurethanes, Chemistry and Technology", by Saunders and Frisch, Interscience Publishers, New York, Vol. I, pp. 32-42, 44-54 (1962) and Vol II. Pp. 5-6, 198-199 (1964); *Organic Polymer Chemistry* by K. J. Saunders, Chapman and Hall, London, pp. 323-325 (1973); and *Developments in Polyurethanes*, Vol. I, J. M. Burst, ed., Applied Science Publishers, pp. 1-76 (1978). Representative of suitable polyols include polyester, polylactone, polyether, polyolefin, polycarbonate polyols, and various other polyols. If desired, the polyol formulation may also contain copolymer polyols such as those of styrene/acrylonitrile (SAN), polyisocyanate polyaddition products (PIPA) or polyurea polyols (PHD).

Generally the polyol will have a functionality of from 2 to 8. Preferably the polyol or polyol composition will have an average functionality of 3 to 6. The polyol or polyol composition will generally have a hydroxyl number of from 150 to 1,200. Preferably the hydroxyl number is from 200 to 1000 and more preferably from 300 to 800.

Illustrative polyester polyols may be prepared from organic dicarboxylic acids having from 2 to 12 carbon atoms, preferably aromatic dicarboxylic acids having from 8 to 12 carbon atoms, and polyhydric alcohols, preferably diols, having from 2 to 12, preferably from 2 to 8 and more preferably 2 to 6 carbon atoms. Examples of dicarboxylic acids are succinic acid, glutaric acid, adipic acid, suberic acid, azelaic acid, sebacic acid, decanedicarboxylic acid, malonic acid, pimelic acid, 2-methyl-1,6-hexanoic acid, dodecanedioic acid, maleic acid and fumaric acid. Preferred aromatic dicarboxylic acids are phthalic acid, isophthalic acid, terephthalic acid and isomers of naphthalene-dicarboxylic acids. Such acids may be used individually or as mixtures. Examples of dihydric and polyhydric alcohols include ethanediol, diethylene glycol, triethylene glycol, 1,2- and 1,3-propanediol, dipropylene glycol, 1,4-butanediol and other butanediols, 1,5-pentanediol and other pentanediols, 1,6-hexanediol, 1,10-decanediol, glycerol, and trimethylolpropane. Illustrative of the polyester polyols are poly(hexanediol adipate), poly(butylene glycol adipate), poly(ethylene glycol adipate), poly(diethylene glycol adipate), poly(hexanediol oxalate), poly(ethylene glycol sebecate), and the like.

While the polyester polyols can be prepared from substantially pure reactants materials, more complex ingredients can be used, such as the side-stream, waste or scrap residues from the manufacture of phtalic acid, terephtalic acid, dimethyl terephtalate, polyethylene terephtalate and the like. Other source is the recycled PET (polyethylene terephtalate). After transesterification or esterification the reaction products can optionally be reacted with an alkylene oxide.

Another class of polyesters which may be used is polylactone polyols. Such polyols are prepared by the reaction of a lactone monomer; illustrative of which is δ-valerolactone, ε-caprolactone, ε-methyl-ε-caprolactone, ξ-enantholactone, and the like; with an initiator that has active hydrogen-containing groups; illustrative of which is ethylene glycol, diethylene glycol, propanediols, 1,4-butanediol, 1,6-hexanediol, trimethylolpropane, and the like. The production of such polyols is known in the art; see, for example, U.S. Pat. Nos. 3,169,945, 3,248,417, 3,021,309 and 3,021,317. The preferred lactone polyols are the di-, tri-, and tetra-hydroxyl functional ε-caprolactone polyols known as polycaprolactone polyols.

The polyether polyols include those obtained by the alkoxylation of suitable starting molecules with an alkylene oxide, such as ethylene, propylene, butylene oxide, or a mixture thereof. Examples of initiator molecules include water, ammonia, aniline or polyhydric alcohols such as dihyric alcohols having a molecular weight of 62-399, especially the alkane polyols such as ethylene glycol, propylene glycol, hexamethylene diol, glycerol, trimethylol propane or trimethylol ethane, or the low molecular weight alcohols containing ether groups such as diethylene glycol, triethylene glycol, dipropylene glyol or tripropylene glycol. Other commonly used initiators include pentaerythritol, xylitol, arabitol, sorbitol, sucrose, mannitol, bis-phenol A and the like. Other initiators include linear and cyclic amine compounds which may also contain a tertiary amine, such as ethanoldiamine, triethanoldiamine, and various isomers of toluene diamine, methyldiphenylamine, aminoethylpiperazine, ethylenediamine, N-methyl-1,2-ethanediamine, N-methyl-1,3-propanediamine, N,N-dimethyl-1,3-diaminopropane, N,N-dimethylethanolamine, 3,3-diamino-N-methylpropylamine, N,N-dimethyldipropylenetriamine, aminopropyl-imidazole and mixtures thereof. Preferred are poly(propylene oxide) polyols and poly(oxypropylene-oxyethylene)polyols is used. These polyols are conventional materials prepared by conventional methods. Catalysis for this polymerization can be either anionic or cationic, with catalysts such as tertiary amine, KOH, CsOH, boron trifluoride, or a double cyanide complex (DMC) catalyst such as zinc hexacyanocobaltate or quaternary phosphazenium compound. In the case of alkaline catalysts, these alkaline catalysts are either removed from the polyol at the end of production by a proper finishing step, such as coalescence, magnesium silicate separation or acid neutralization, or are reacted in situ. For instance KOH can be acid neutralized and/or can be left in the polyol as an additional catalyst.

Other polyether polyols include the poly(tetramethylene oxide)polyols, also known as poly(oxytetramethylene)glycol, that are commercially available as diols. These polyols are prepared from the cationic ring-opening of tetrahydrofuran and termination with water as described in Dreyfuss, P. and M. P. Dreyfuss, Adv. Chem. Series, 91, 335 (1969).

Polycarbonate containing hydroxyl groups include those known per se such as the products obtained from the reaction of diols such as propanediol-(1,3), butanediols-(1,4) and/or hexanediol-(1,6), diethylene glycol, triethylene glycol or tetraethylene glycol with diarylcarbonates, for example diphenylcarbonate or phosgene.

Illustrative of the various other polyols suitable are the styrene/allyl alcohol copolymers; alkoxylated adducts of dimethylol dicyclopentadiene; vinyl chloride/vinyl acetate/vinyl alcohol copolymers; vinyl chloride/vinyl acetate/hydroxypropyl acrylate copolymers, copolymers of 2-hydroxyethylacrylate, ethyl acrylate, and/or butyl acrylate or 2-ethylhexyl acrylate; copolymers of hydroxypropyl acrylate, ethyl acrylate, and/or butyl acrylate or 2-ethylhexylacrylate, and the like.

Copolymer polyols containing polymerized styrene and acrylonitrile fillers can also be used in the polyol formulation.

For enhancing the solubility of a blowing agent, such a fluorinated hydrocarbon or pure hydrocarbon, it may be advantageous to include in the polyol composition a polyol containing tertiary nitrogen. Examples of such amine containing initiators are given above.

To lower the thermal conductivity of the foam and get some autocatalytic effect, a polyol initiated with an aromatic amine is preferably included within the polyol composition. Examples of such polyols include an alkylene oxide adduct of phenol/formaldehyde/alkanolamine resin frequently called a "Mannich" polyol, such as disclosed in U.S. Pat. Nos. 4,883, 826, 4,939,182 and 5,120,815. Polyether polyols based on an aromatic polyamine include those initiated, for example, with 2,3-, 3,4-, 2,4- and 2,6-tolulenediamine, 4,4', 2,4'- and 2,2'-diaminodiphenylmethane, polyphenyl-polymetlhylene-polamines, 1,2-, 1,3- and 1,4-phenylenediamine and mixtures thereof. Such polyols are disclosed, for example in U.S. Pat. Nos. 5,895,793 and 5,962,2542, the disclosures of which are incorporated by reference. When used, the aromatic amine initiated polyols are used at a level of 3 to 90, preferably 10 to 60 parts by weight of the polyol composition.

The polyol composition may also contain other "autocatalytic" polyols to reduce the amount of gelling or blowing catalyst needed in the polyol formulation. Such autocatalytic polyols contain at least one tertiary amine, and preferably at least one N-alkyl amine group and more preferably at least one N,N-dialkylamino group where the alkyl contains from 1 to 3 carbon atoms. Examples of such polyols are disclosed in U.S. Pat. Nos. 5,476,969 and 6,762,274; PCT publication 02/22702 and tertiary amine diols as disclosed in EP publication 0488219. Integration of tertiary amine functions in the polyol chain can be done by using an alkylaziridine as a comonomer when making the polyether polyol. Other autocatalytic polyols are conventional polyols capped with a tertiary amine group as described in WO 94/02525. When used, such autocatalytic polyol comprises from 2 to 80 and preferably from 5 to 60 percent by weight of the polyol composition.

If looking at flame retardant properties of the foam, due to the flame retardant properties associated with aromatic-initiated polyols, it is advantageous to use an aromatic-initiated polyether or polyester polyol as part of the polyol composition. Examples of aromatic-initiated polyether polyol is an alkylene oxide adduct of a phenol/formaldehyde resin, frequently called a "novolac" polyol, such as disclosed in U.S. Pat. Nos. 3,470,118 and 4,046,721.

While it is generally preferred to use a polyol or polyol composition having a low viscosity for ease of processing, the process conditions of the present invention allow use of a polyol formulation having a viscosity of 3000 mPa·s or greater (measured at 25° C.) without the auxiliary blowing agent. Polyol formulations having higher viscosity result in higher viscosities of the system formulation. It is believed that a higher viscosity of the system formulation hinder the drainage of liquids in the cell structure during foam rise giving smaller cell size which aids in getting lower lambda values with good retention over time.

Suitable polyisocyanates used in the present invention are aliphatic, cycloaliphatic, alicyclic, arylaliphatic, aromatic polyisocyanates and derivatives thereof. Such derivatives include allophonate, biuret and NCO terminated prepolymer. Aromatic isocyanates, especially aromatic polyisocyanates are preferred. It is preferred to use aromatic diisocyanates such as isomers of toluene diisocyanate (TDI), crude TDI, isomers of diphenyl methane diisocyanate, m- and p-phenyl-diisocyanate, and higher functional polymethylene polyphenyl polyisocyanate; aromatic triisocyanates such as 4,4',4"-triphenyl methane triisocyanate and 2,4,6-toluene triisocyanate; aromatic tetraisocyanates; aliphatic isocyanates such as hexamethylene-1,6-diisocyanate; and alicyclic isocyanates such as hydromethylene diphenyldiisocyanate.

In one embodiment, it is preferred to use polymethylene polyphenylene polyisocyanates (MDI). As used herein MDI refers to polyisocyanates selected from diphenylmethane diisocyanate isomers, polyphenyl polymethylene polyisocyanates and derivatives thereof bearing at least two isocyanate groups.

The crude, polymeric or pure MDI can be reacted with polyols or polyamines to yield modified MDI. The MDI advantageously has an average of from 2 to 3.5, and preferably from 2.0 to 3.2 isocyanate groups per molecule. Especially preferred are methylene-bridged polyphenyl polyisocyanates and mixtures thereof with crude diphenylmethane diisocyanate, due to their ability to cross-link the polyurethane. The crude MDI preferably contains from 30 to 60 percent of diphenylmethane diisocyanate isomers.

Mixtures of isocyanates and crude polyisocyanates polyisocyanates as well as MDI and TDI prepolymers, blends thereof with polymeric and monomeric MDI may also be used in the practice of this invention.

The total amount of polyisocyanate used to prepare the foam in the present inventions should be sufficient to provide an isocyanate reaction index of from 70 to 150 (or less). Preferably the index is from 100 to 140. More preferably the index is from 110 to 130. An isocyanate reaction index of 100 corresponds to one isocyanate group per isocyanate reactive hydrogen atom present, such as from water and the polyol composition.

Suitable physical blowing agents for use in the present invention are those having a boiling point above freezing. Preferably the blowing agent has a boiling point above 10° C. and more preferably 15° C. or higher. In particular, use is made of low-boiling hydrocarbons, lower monofunctional alcohols, acetals or partially halogenated hydrocarbons, known as hydrochlorofluorocarbons (HCFCs) or hydrofluorocarbons (HFCs), formic acid and methyl formate. Preference is given to cyclic and acyclic saturated hydrocarbons having up to 12 carbon atoms. The blowing agents may be used individually or in mixtures with one another. Technical grade of hydrocarbons may also be used.

Hydrocarbon blowing agents include for example, propane, n-butane, isobutene, isobutene, n-pentane, isopentane, cyclopentane, cyclobutane, 2,2-dimethylbutane, dimethyl ether, methyl ethyl ether, methyl butyl ether and diethyl ether. Examples of HFCs or HFA's (hydrofluoroalkane) include for example trifluoroethane, pentafluoroethane, pentafluorobutane (HFC 365mfc), perfluorocyclobutane, heptafluoropropane (HFC 227ea), pentafluoropropane (HFC 245fa) hexafluoropropane, tetrafluoroethane (HFC 134a), trifluoromethane, difluoromethane, hexafluorobutane and difluoroethane.

Due to the in-mold reduced pressure, blowing agents having a high boiling point, that is, above 50° C., such as cyclohexane or methyl-cyclohexane can be used in the present invention.

Optionally products having a boiling point below 0° Celsius, such as for instance isobutene, can be combined with the other blowing agents listed heretofore.

Other blowing agents which may be used in combination with these compounds are rare gases such as Krypton or Xenon.

All aforementioned physical blowing agents can be used as pure components as well as mixtures of these various physical blowing agents.

Water may be used as a chemical co-blowing agent. Generally due to the reduced pressure, over the reference pressure of 1000 mbar, water is present in a level of 2.5 weight percent or less of the total polyol formulation. Preferably the amount of water is from 0.1 to 2 weight percent of the total polyol formulation. More preferably the water is present at 0.2 to 1.5 weight percent of the polyol formulation. In an even more preferred embodiment, the amount of water is less than 1.0 weight percent of the polyol formulation composition. A water content which is too high can lead to increased brittleness and thermal conductivity of the foam, and the aging of the foam (increase with time of the thermal conductivity due to cell gas diffusion of formed $CO_2$ out of the foam)

The amount of hydrocarbon, HFC or a combination thereof, will generally be at least 5 parts per hundred parts of the polyol formulation. Preferably the amount of physical blowing agent will be 30 parts or less per hundred parts of the polyol formulation. Preferably the amount of physical blowing agent is from 12 to 25 parts per hundred parts of the polyol formulation.

The blowing agent is preferably introduced by known methods into at least one formative component for the polyurethane, such as the polyisocyanate or polyol formulation. If desired the blowing agent may be introduced directly into the reaction by means of suitable mixing means known in the art. The blowing agents, particularly the hydrocarbon blowing agent, may be used in the form of an emulsion in the polyol formulation.

Catalysts used for producing the rigid foams of the present invention are, in particular, compounds which strongly accelerate the reaction of the compounds containing reactive hydrogen atoms, in particular hydroxyl groups, with the organic, modified or unmodified polyisocyanates. Preferred catalysts for this purpose are tertiary amines, tin and bismuth compounds, alkali metal and alkaline earth metal carboxylates, quaternary ammonium salts, s-hexahydrotriazines and tris(dialkylaminomethyl)phenols.

Examples of suitable catalysts are organic metal compounds, preferably organic tin compounds such as tin(II) salts of organic carboxylic acids, e.g.. tin(II) acetate, tin(II) octoate, tin(II) ethylhexoate and tin(II) laurate, and the dialkyltin(IV) salts of organic carboxylic acids, e.g.. dibutyltin diacetate, dibutyltin dilaurate, dibutyltin maleate and dioctyltin diacetate. The organic metal compounds are used alone or preferably in combination with strongly basic amines. Examples of amines are amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethyl-butanediamine, N,N,N',N'-tetramethylhexane-1,6-diamine, pentamethyldiethylenetriamine, bis(dimethylaminoethyl)ether, bis(dimethylaminopropyl)urea, dimethylpiperazine, 1,2-dimethylimidazole, 1-azabicyclo[3.3.0]octane and preferably 1,4-diazabicyclo[2.2.2]octane, and alkanolamine compounds such as triethanolamine, triisopropanolamine, N-methyldiethanolamine and N-ethyldiethanolamine and dimethylethanolamine. Example of commercial products are Polycat 5, Polycat 8, Polycat 12, Polycat 41, Polycat 46, Dabco 33 LV, Dabco T-12,Dabco TMR-2, available from Air Products and Chemicals inc., KAO 1, Curithane 52, Curithane 206.

Other suitable catalysts are: tris(dialkylaminoalkyl)-s-hexahydrotriazines, in particular tris(N,N-dimethylaminopropyl)-s-hexahydrotriazine, tetraalkylammonium hydroxides such as tetramethylammonium hydroxide, alkali metal hydroxides such as sodium hydroxide and alkali metal alkoxides such as sodium methoxide and potassium isopropoxide, and also alkali metal salts of long-chain fatty acids having from 10 to 20 carbon atoms and possibly lateral hydroxyl groups, potassium acetate, potassium octoate, sodium acetate, iron acetyl acetonate, and blends thereof.

As already mentioned additional catalytic activity may be provided by the polyol blend when it contains nitrogen as it is the case with Mannich polyols or polyols initiated with TDA, MDA, piperazine derivatives, aliphatic amines containing N-methyl or N-dimethyl moieties or combination there from.

To obtain the desired reactivity of the system in the present invention, generally from 0.001 to 10 percent by weight, in particular from 0.5 to 6 percent by weight, of catalyst or catalyst combination, based on the total weight of the polyol formulation. If a catalytic polyol is present in the polyol composition, the level of typical polyurethane catalyst in the polyol formulation can be reduced.

The desired reactivity should provide a foaming profile giving good mold filling under the conditions of this invention. that is reduced in-mold pressure. Good mold filling means that the mold is completely filled with the rigid foam without internal voids. The foam formulation, including the blowing agent and the isocyanate, should produce a rigid foam having very fine cells, fast curing, and enhanced thermal conductivity. Furthermore the foam should have good physical strength and proper resistance to heat and humid aging while maintaining low lambda value over time.

The polyol formulations used in the invention will generally result in a gelation time of 15 to 50 seconds, preferably 18 to 45 s and more preferably from 20 to 40 s if foaming is done under free rise conditions using a high pressure machine, such as those built by Cannon, Krauss-Maffei or Hennecke. The filling time extends from the time of mixing/injection to the time at which the mold is completely filled. The filling time should be 10-30 percent faster than the gel time, to allow easier (more liquid) filling of the mold with the foam and avoiding void formation at the interface between foam and metal or plastic liner. The in-mold pressure can be varied to tune the filling time in line with the gel time.

If desired, various additives can be incorporated into the reaction mixture for producing the rigid foams of the present invention. Examples are surface-active substances, foam stabilizers, cell regulators, flame retardants, fillers, dyes, pigments, hydrolysis inhibitors, fungistatic and bacteriostatic substances.

Suitable surface-active substances are, for example, compounds which serve to aid the homogenization of the starting materials and may also be suitable for regulating the cell structure of the foam. Those are supplied under the trademarks NIAX™, DABCO™ and TEGOSTAB™ by GE Plastics, Air Products and Degussa, respectively. Other examples which may be mentioned are emulsifiers such as the sodium salts of castor oil sulfates or of fatty acids and also amine salts of fatty acids, e.g.. diethylamine oleate, diethanolamine stearate, diethanolamine ricinoleate, salts of sulfonic acids, e.g.. alkali metal or ammonium salts of dodecylbenzene- or dinaphthylmethanedisulfonic acid and ricinoleic acid. Foam stabilizers include for example, siloxane-oxalkylene copolymers and other orgaliopolysiloxanes, ethoxylated alkylphenols, ethoxylated fatty alcohols, paraffin oils, castor oil or ricinoleate esters, Turkey red oil and peanut oil and cell regulators such as paraffins, fatty alcohols and dimethylpolysiloxanes. The above-described oligomeric acrylates having polyoxyalkylene and fluoroalkane radicals as side groups are also suitable for improving the emulsifying action, the cell structure and/or stabilizing the foam. The surface-active substances are usually employed in amounts of from 0.01 to 5 parts by weight, preferably 0.5 to 4 parts per 100 parts of polyol formulation.cleating agents, such as perfluoroalkanes, are important additives in the field of rigid foam since they help regulate foam cell structure, hence they can be used with the present invention.

Any known liquid or solid flame retardant can be used in the present invention. Generally such flame retardant agents are halogen-substituted phosphates, phosphate esters, phosphonate esters and inorganic flame proofing agents. Generally such flame retardant agents are halogen-substituted phosphates, inorganic flame proofing agents or organo-phosphous compounds. Common halogen-substituted phosphates are tricresyl phosphate, tris(1,3-dichloropropyl phosphate, tris(2,3-dibromopropyl)phosphate, tris(2-chloropropyl)-phosphate, chloropropyl bis(bromopropyl)phosphate and tetrakis (2-chloroethyl)ethylene diphosphate. Inorganic flame retardants include red phosphorous, aluminum oxide hydrate, antimony trioxide, ammonium sulfate, expandable graphite, urea or melamine cyanurate or mixtures of at least two flame retardants. In general, when present, flame retardants are added at a level of from 5 to 50 parts by weight, preferable from 5 to 25 parts by weight of the flame retardant per 100 parts per weight of the polyol formulation.

Examples of fillers include talcs, clays, silicas, calcium carbonates, graphites, glass, carbon black, plastic powders such as ABS; glass fibers or other ceramics, or polymers such as polyamide, propylene or recycled polyurethane foam.

The catalyst, blowing agent and other optional components are preferably mixed with the polyol components. The foam is made by mixing the polyol formulation and the isocyanate components at approximate 20° C. in the presence of the blowing and injecting into a mold cavity which has an internal air pressure below reference pressure of 1000 mbar and under such conditions that the polyols and polyisocyanate(s) react and cure. It is usually not necessary to pre-heat the components or apply heat to the reaction mixture in order to obtain a good reaction and cure but heating may be used if desired. However, the mold cavity is generally heated, preferably heated at 30 to 60° C., more preferably from 40 to 50° C., to provide efficient adhesion of the foam to the mold or to the plastic and metal liner. The mold has an internal air pressure, according to this invention, which is sufficient to provide a good filling with the used foaming composition. The internal mold pressure can vary between 300 and 950 mbar, preferably between 400 and 900 mbar, and more preferably from 500 to 850 mbar. The internal air pressure is controlled in such that the moulded density can be obtained with the right balance of filling vs. gelling time. Alternatively, applying a vacuum just after the injection of the foaming composition may be done, but this is not the preferred option. By injection under reduced in-mold pressure, or applying vacuum just after injection, allows the foaming composition to flow and fill the cavity quicker and more efficiently than with the present technology based on atmospheric pressure, hence more viscous, or more reactive, foam formulations can be used with the present invention. Techniques for applying a partial vacuum to a mold cavity are known in the art, see for example U.S. Pat. Nos. 5,454,582 and 5,972,260. Prior to injection under reduced pressure in the mold cavity, the cavity may be purged with an inert gas, such as nitrogen, for safety reasons when flammable blowing agents are used in the foam formulation.

The cured foam preferably exhibit a lambda value (k-factor) measured on a sample cut in its core, at 10° C. average temperature, 24 hours after foam production of less than 20 mW/mK, preferably less than 19 mW/mK, and more preferably less than 18 mW/mK. The molded density of the foam is generally from 33 to 38 kg/m$^3$. Preferably the density is from 34 to 37 and more preferably from 34 to 36 kg/m$^3$. To obtain the foams within the desired density range under the partial vacuum employed and to assure the entire mold cavity is properly filled, the mold is generally filled to a packing factor of greater than 1.03 and is not higher than 1.9. Preferably the packing factor is set from 1.06 to 1.6 and more preferably from 1.1 to 1.5.

The demold time, is determined by the time needed for a foamed object such as a refrigerator to be sufficiently dimensionally stable when taken out of the jig. The demold time is desirably from 2 to 7 minutes, preferably less than 6 minutes, and more preferably from 2 to 5 minutes for standard European refrigerators and freezers with a wall thickness of 4 to 7 cm, thicker walls will obviously require longer demould times e.g.. 10 minutes for a 12 cm thickness. A way to compare demold time performance of the polyurethane formulation is to measure the post expansion of the molded foams without liners, produced with the different polyurethane formulations. The measure is performed 24 hours after foaming. Foams are demolded at different times to allow sufficient mass expansion which can be compared relative to the original mold thickness. The post expansion (at time t) is the maximum thickness of the foam divided by the mold thickness. The results are reported in percent. Currently, a total deformation of 3 to 4 mm on both cabinet walls of a refrigerator for the European market is considered acceptable.

The lambda ratio is the ratio of the molded density (in kg/m3) to the Lambda value of the foam (in mW/m.K) measured at 10° C. average temperature, 24 hours after foam production). Produced by the process of the present invention, the lambda ratios generally have a value greater than 1.65, preferably greater than 1.70 and more preferably greater than 1.75. With a maximum molded density being 38 kg/m$^3$. Based on the constraints of the polyurethane system, the lambda ratio values will generally be less than 2.50, preferably less than 2.15.

The rigid polyurethane foams produced from the process of the present invention are preferably used as heat-insulating for foam-filling cavities in housings for refrigeration equipment, in particular for refrigerators and freezers, and as jackets of hot-water storage tanks. The products may also be used as a composite element in such applications.

The following examples are given to illustrate the invention and should not be interpreted as limiting in anyway. Unless stated otherwise, all parts per hundred parts polyol formulation.

A description of the raw materials used in the examples is as follows:

DSD 287.02 A formulated polyol with a hydroxyl number of 365, a viscosity at 25° C. of 2000 mPa·s and a water content of 2.3 percent available from The Dow Chemical Company.

Voratec SD 308 A formulated polyol with a hydroxyl number of 385, a viscosity at 25° C. of 3500 mPa·s and a water content of 2.4 percent commercially available from The Dow Chemical Company.

Polyol formulation A A formulated polyol identical to Voractec SD 308 except ot contains only 1.0 percent water Voranol RN 482 Propoxylated sorbitol with a hydroxyl number of 490 available from The Dow Chemical Company.

Voranol CP 1055 Propoxylated glycerol with a hydroxyl number of 156 available from The Dow Chemical Company.

Voranol RA 640 Propoxylated ethylenediamine with a hydroxyl number of 640, available from The Dow Chemical Company.

Stepanpol PS 3152 Aromatic polyester polyol available from Stepan and having a hydroxyl number of 315.

Tercarol 5903 Propoxylated toluenediamine with an hydroxyl number of 440 available from The Dow Chemical Company.

Polyol A Propoxylated ammonia with a hydroxyl number of 500.

Voratec SD 100 A polymeric MDI available from The Dow Chemical Company.

Polycat 5 An amine catalyst available from Air Products & Chemicals Inc.

Polycat 8 An amine catalyst available from Air Products & Chemicals Inc.

Dabco TMR-30 A catalyst available from Air Products & Chemicals Inc.

Silicon A A rigid foam surfactant available from Goldschmidt-Degussa under the trademark TEGOSTAB™ A silicon surfactant.

Silicon B A rigid foam surfactant available from GE Plastics available under the trademark NIAX™ surfactant.

All foams are made using a high pressure Cannon machine equipped with a mix-head attached to the mold injection hole, in a laboratory where the atmospheric pressure is about 1,000 mbar (or hPa). Premix and isocyanate are injected at a pressure of 90 bars or higher. The Brett mold is made of aluminum with dimensions of 194×35×6 cm and has no venting to allow the creation of an under pressure in the mold during foaming, therefore there is no extrusion of the foaming mass. The internal pressure of the mold is controlled via a pipe connected to a 500 liter buffer tank that is connected to a medium capacity vacuum pump (1500 l/min). The vacuum in the buffer tank, and thus the in mold air pressure, is maintained with control valves. The foams produced in this Brett mold can be used to measure lambda, compression strength, molded density, and density distribution. A second mold (Jumbo mold) with dimensions 70×40×10 cm is similarly injected to obtain foams demolded at different times with the purpose to measure the post expansion, hence the rate of foam curing. The temperature of the mold is about 45° C. The release agent applied to the mold is ACMOS 180-52, supplied from Acmos. Application of the technology is done with refrigerator molds similar to what is used by the appliance industry, such as the one presented in example 5 hereafter.

Lambda is measured at 24° C. or at 10° C. (average temperature) according to ISO 12939-01/DIN 52612. Foam samples are cut from the core of the molded part 24 hours after foam production and these samples are measured immediately after cutting. To measure lambda aging, the aforementioned sample is measured at specific intervals of time afterwards while foam sample is maintained at 25° C. and 50 percent Relative Humidity. It is generally accepted in this area that the difference between the lambda results measured at 10 and 24° C. for hydrocarbons blown foams is $Lambda_{(24° C.)} = Lambda_{(10° C.)} + 1.4$ mW/m.K.

Molded foam and free rise foam densities are measured according to ASTM 1622-88.

Foam compressive strength in kPa is measured according to DIN 53421-06-84.

Foam post expansion differences are a way to measure the level of foam curing and to compare demoulding times for the production of refrigerators if the foam formulation is changed. The post expansion is calculated from the maximum foam thickness after 24 hours divided by the original mold thickness. If a foam is demolded earlier, the post expansion will be higher. Similarly a reduced foam expansion at same demould time will allow such foam formulations to be demolded earlier.

Post expansion is measured both on Brett molded foams and Jumbo molded foams. Because post expansions are also dependant on the mold dimensions, results from different molds cannot be compared to each other.

For the cabinet comparison, completely assembled refrigerator cabinets are taken from a pre-assembly line and placed in a tightly closed jig, having a wooden mask well fitted to the plastic inner liner of the cabinet. Both "interspaced" areas between jig and metal outer liner and wooden mask and plastic inner liner could be evacuated. The internal pressure, in these "interspaced" areas, is controlled via a pipe connected to a 500 liter buffer tank that is connected to a medium capacity vacuum pump (1500 l/min). The normal venting openings of the cabinet (open slit between metal and plastic liner, pre punctured venting holes in the inner liner, etc) to the "interspaced" areas, allow the internal pressure to be reached in the cabinet cavity that has to filled with polyurethane foam. The vacuum in the buffer tank, and thus the in mold air pressure, is maintained with control valves.

COMPARATIVE EXAMPLES C1* And C2*

A conventional formulation (VORATEC SD308 with 2.4 percent water), presently used in the industry (Example C1) has a free rise density of 22.2 kg/m$^3$. The formulation was injected into a mold at ambient pressure of about 1000 mbar to produce standard foam. This system was then injected in the mold maintained at 800 mbar (Example C2). These comparative examples show that use of reduced in-mold pressure only, as taught by prior art, does not provide improvements in foam thermal insulation and post expansion. The 20 percent reduced in mold air pressure leads to the expected reduction in foam density, in fact a much higher than normal overpack had to be applied at reduced pressure to avoid immediate shrinkage of the resulting foam. The produced foam with molded density of 32.6 kg/M$^3$ remained dimensionally stable. In both cases the demolding time of the Bretts is 7 minutes to minimize post expansion and skin formation. Post expansion of the Jumbo molded foams shows the increase in post expansion with shorter demould time and the similarity in results, provided the foam formulation is similar and molded density differ not more than 8 percent. The formulations and the foam properties of C1 and C2 are given in Table 1.

TABLE 1

|  |  | Example | |
|---|---|---|---|
|  |  | C1* | C2* |
| VORATEC SD 308 | parts | 100 | 100 |
| Cyclopentane | parts | 14.5 | 14.5 |
| Voratec SD 100 | parts | 144 | 144 |
| Gelation time | sec. | 40 | 40 |
| FRD | kg/m$^3$ | 22.2 | 22.2 |
| In mold pressure | mbar | 1,000 | 800 |
| Brett demolding time | min | 7 | 7 |
| Minimum fill density | kg/m$^3$ | 30.6 | 22.5 |
| Part weight | G | 1445 | 1310 |
| Molded density | kg/m$^3$ | 35.3 | 32.6 |
| Overpack | % | 15 | 45 |
| Packing factor | — | 1.59 | 1.47 |
| Lambda$_{(24° C.)}$ | mW/m · K | 21.3 | 21.3 |
| Lambda$_{(10° C.)}$ | mW/m · K | 19.9 | 19.9 |
| Molded dens/Lambda$_{(10° C.)}$ | Kg · K/mW · m$^2$ | 1.774 | 1.638 |
| Average Comp. Str. (10%) | kPa | 133 | 120 |
| Post exp. Jumbo, 7 min | % | 3.0 | 3.1 |
| Post exp. Jumbo, 6 min | % | 3.9 | 3.8 |
| Post exp. Jumbo, 5 min | % | 5.5 | 5.2 |

*not part of this invention

These comparative examples use 0.337 moles of gas for the foam expansion of which 39.5 percent was carbon dioxide, generated by the water-isocyanate reaction. It is well known that $CO_2$ tends to diffuse quickly out of polyurethane foam.

EXAMPLE 1

The formulation of examples C1 and C2 is modified by decreasing the water content of Voratec SD 308 and adding Polycat 5 and Polycat 8 (Table 2). The level of cyclopentane is also increased slightly, to compensate for the reduction of water. A clear reduction (5 percent) of thermal insulation (Lambda) is observed with foam of examples 1 versus foams of examples C1 and C2. Also post expansions values are significantly less versus the reference foams of C1 and C2. This means that the demolding time of refrigerators produced with the foam of example 1 will be shorter. If the same PU formulation is molded at reference pressure of 1000 mbar (comparative example C3), it results in equal lambda but much higher molded density and post expansion. While high densities are not economically feasible, they also give unacceptable foaming pressure (around 1.8 bar) to the mold walls.

TABLE 2

|  |  | Example | |
|---|---|---|---|
|  |  | 1 | C3 |
| Polyol formulation A | parts | 99.1 | 99.1 |
| Polycat 5 | parts | 0.4 | 0.4 |
| Polycat 8 | parts | 0.5 | 0.5 |
| Cyclopentane | parts | 16 | 16 |
| Voratec SD 100 | parts | 130 | 130 |
| Gelation time | seconds | 46 | 46 |
| Free rise density | kg/m$^3$ | 26.4 | 26.4 |
| In-mold pressure | mbar | 800 | 1000 |
| Brett demolding time | min | 4 | 4 |
| Minimum fill density | kg/m$^3$ | 30.4 | 40.1 |
| Part weight | G | 1458 | 1805 |
| Measured molded density | kg/m$^3$ | 35.7 | 44.1 |
| Overpack | % | 20 | 15 |
| Packing factor | — | 1.35 | 1.67 |

TABLE 2-continued

|  |  | Example | |
|---|---|---|---|
|  |  | 1 | C3 |
| Lambda$_{(24° C.)}$ | mW/m · K | 20.1 | 20.2 |
| Lambda$_{(10° C.)}$ | mW/m · K | 18.7 | 18.8 |
| Molded dens/Lambda$_{(10° C.)}$ | kg · K/mW · m$^2$ | 1.909 | 2.346 |
| Average Comp. Str. (10%) | kPa | 122 | 182 |
| Post exp. Jumbo, 7 min | % | 1.4 | 6.4 |
| Post exp. Jumbo, 6 min | % | 1.8 | 6.7 |
| Post exp. Jumbo, 5 min | % | — | — |

Foam characteristics, especially, compression strength and dimensional stability, are comparable to foam of example C1. The Brett demolding time is less than 5 minutes for example 1. The post expansion data and the lambda data of example 1 are significantly less than comparatives 1, 2 and 3, while the molded densities of example 1 is comparable to the molded densities of comparatives 1 and 2. The molded density of comparative example 3 is significantly higher than example 2, this reveals the advantage of the present invention, that is use of low in-mold pressure.

Example 1 and comparative example 3 are based on 0.281 moles of gas of which 20.0 percent is $CO_2$. Hence there is a significant reduction of CO2 with the present invention. Additionally the level of isocyanate is also reduced with example 1 versus comparative examples 1 and 2 while both systems are run at an index of 115.

EXAMPLES 2 AND 3

The formulation of example 1 is modified by a further increase of catalysts for example 2. Example 3 has a totally different polyol combination. The amount of isocyanate is balanced to maintain the index at 115. The formulations and properties of foams produced is given in Table 3. Both show an important improvement (>6 percent) of thermal conductivity versus the comparative examples C1 and C2. Also the post expansion is less at 5 minutes demould than the comparative examples at 7 minutes demould. Surprisingly these properties are achieved without negative impact on moulded density and Foam Compressive Strength.

TABLE 3

|  |  | Example | |
|---|---|---|---|
|  |  | 2 | 3 |
| VORANOL RN482 | parts | — | 70.1 |
| Water | parts | 1.0 | 1.0 |
| Polycat 5 | parts | 0.4 | 1.5 |
| Polycat 8 | parts | 1.03 | 1.13 |
| Dabco TMR 30 | parts | 2.67 | 1.38 |
| Stepanpol PS 3152 | parts | — | 14.9 |
| Polyol A | parts | — | 10 |
| Silicon A | parts | — | 1.5 |
| Cyclopentane | parts | 16 | 16 |
| Voratec SD 100 | parts | 130 | 144 |
| Gelation time | seconds | 34 | 32 |
| Free rise density | kg/m$^3$ | 26.2 | 25.4 |
| In-mold pressure | mbar | 750 | 800 |
| Brett demolding time | min | 4 | 4 |
| Minimum fill density | kg/m$^3$ | 29.3 | 29.4 |
| Part weight | g | 1441 | 1442 |
| Measured molded density | kg/m$^3$ | 35.5 | 35.8 |
| Overpack | % | 20 | 15 |
| Packing factor | — | 1.35 | 1.41 |
| Lambda$_{(24° C.)}$ | mW/m · K | 19.9 | 19.5 |
| Lambda$_{(10° C.)}$ | mW/m · K | 18.5 | 18.1 |
| Molded dens/Lambda$_{(10° C.)}$ | kg · K/mW · m$^2$ | 1.919 | 1.978 |

TABLE 3-continued

|  |  | Example | |
|---|---|---|---|
|  |  | 2 | 3 |
| Average Comp. Str. (10%) | kPa | 126 | 143 |
| Post exp. Jumbo, 7 min | % | — | — |
| Post exp. Jumbo, 6 min | % | 2.3 | 2.6 |
| Post exp. Jumbo, 5 min | % | 2.6 | 2.8 |

The faster gelation time of examples 2 and 3 gives improved thermal insulation (Lambda) over example 1. Further the post expansion data of examples 2 and 3 are improved over comparative examples C1 and C2. Additional aromatic polyol (example 3 vs. example 2) gives further lambda reduction. Hence fast gelation systems with high aromaticity are preferred with the present invention.

The gas level in the foam of example 3 and 4 is 0.281 moles with 20.0 percent $CO_2$.

EXAMPLE 4

Example 4 is based on another foam formulation confirming the enhanced thermal insulation and fast demold of the technology.

TABLE 4

|  |  | Example 4 |
|---|---|---|
| Voranol RN 482 | parts | 62 |
| Voranol CP 1055 | parts | 10 |
| Tercarol 5903 | parts | 15 |
| Water | parts | 1.0 |
| Polycat 5 | parts | 1.8 |
| Dabco TMR-30 | parts | 1.075 |
| Polycat 8 | parts | 1.625 |
| Silicon B | parts | 3.0 |
| Cyclopentane | parts | 18 |
| Voratec SD 100 | parts | 136 |
| Gelation time | seconds | 36 |
| Free rise density | kg/m³ | 24.4 |
| In-mold pressure | mbar | 800 |
| Brett demolding time | min | 5 |
| Minimum fill density | kg/m³ | 29.3 |
| Part weight | g | 1438 |

TABLE 4-continued

|  |  | Example 4 |
|---|---|---|
| Measured molded density | kg/m³ | 37.4 |
| Overpack | % | 20 |
| Packing factor | — | 1.53 |
| Lambda$_{(24° C.)}$ | mW/m · K | 19.9 |
| Lambda$_{(10° C.)}$ | mW/m · K | 18.6 |
| Molded dens/Lambda$_{(10° C.)}$ | kg · K/mW · m² | 2.011 |
| Average Comp. Str. (10%) | kPa | 121 |
| Post exp. Jumbo, 7 min | % | 1.0 |
| Post exp. Jumbo, 6 min | % | 1.7 |
| Post exp. Jumbo, 5 min | % | 2.2 |

Again a foam has been produced with improved thermal insulation (Lambda) over comparative examples 1, 2 and 3 and examples 2 and 3. Where typically the demould is improved at expense of lambda and/or density, or the lambda is improved at the expense of demould and/or density, the foams produced with this invention can improve lambda and demould while maintaining the commercially acceptable molded density.

The gas level in the foam of example 5 is 0.309 moles with 17.8 percent $CO_2$.

COMPARATIVE C4, C5 AND EXAMPLE 5

Comparative C4 and C5 and Example 5 are appliance cabinets made with formulation DSD 287.02, comparing a normal amount of physical blowing agent at ambient pressure with half the amount of this blowing agent at reduced pressure. These experiments were made on cabinets of a 190 cm high combi refrigerator, having a freezer section in the top with wall thickness up to 90 mm and a refrigerator section in the bottom with wall thickness of 65 mm. The normal demould time of these refrigerators is 6 minutes. The formulations and properties of foams produced is given in Table 5. The post expansions (in mm) are measured on various places of the cabinet and averaged per position in top, left and right side. C4 and C5 are comparative cabinets produced at ambient pressure and demoulded at 5 and 6 minutes respectively. Example 5 is a similar cabinet produced at 800 mbar and demoulded at 5 minutes. Surprisingly these properties are achieved without negative impact on moulded density and Foam Compressive Strength.

TABLE 5

|  |  | Example | | |
|---|---|---|---|---|
|  |  | C4 | C5 | 5 |
| DSD 287.02 | Parts | 100 | 100 | 100 |
| Cyclo/isopentane 70/30 | Parts | 13 | 13 | 8 |
| Voratec SD100 | Parts | 145 | 145 | 145 |
| Gelation time | seconds | 53 | 53 | 50 |
| Free rise density | kg/m³ | 24.1 | 24.1 | 27.1 |
| In-mold pressure | Mbar | 1015 | 1015 | 800 |
| Cabinet demolding time | Min | 5 | 6 | 5 |
| Minimum fill density | kg/m³ | 30.7 | 30.7 | n.d. |
| Part weight | G | 7000 | 6995 | 7003 |
| Measured molded density | kg/m³ | 35.4 | 35.4 | 35.5 |
| Overpack | % | 15 | 15 | n.d |
| Packing factor | — | 1.47 | 1.47 | 1.31 |
| Lambda$_{(24° C.)}$ | mW/m · K | 21.6 | 21.7 | 21.9 |
| Lambda$_{(10° C.)}$ | mW/m · K | 20.2 | 20.4 | 20.5 |
| Molded dens/Lambda$_{(10° C.)}$ | kg · K/mW · m² | 1.752 | 1.735 | 1.732 |
| Average Comp. Str. (10%) | kPa | 142 | n.d. | 143 |
| deformation Top Cabinet | Mm | −1.9 | −1.0 | −0.1 |
| deform. Right Cabinet | Mm | 5.0 | 3.7 | 3.7 |
| deform. Left Cabinet | Mm | 5.0 | 4.7 | 4.2 |

The longer demould time of comparative example C5 gives improved side wall deformation over comparative example C4. Using less physical blowing agent in example 6 and reduced in-mold pressure can surprisingly obtain similar molded density and better density distribution. The better density distribution results in less stress in the foam and to the mold walls which allow to obtain similar to better deformations at shorter demould time. The lower physical blowing agent level gives slightly higher lambda but VOC's will be reduced when dismantling the appliance at the end of its life.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A process for producing a rigid polyurethane foam having a molded density of 33 to 38 kg/m$^3$ and Lambda$_{(10° C.)}$ of less than 21 mW/m.K and a ratio of molded foam density (kg/m$^3$) to Lambda$_{(10° C.)}$ (mW/m.K), measured 24 hours after foam production, from 1.65 to 2.15, obtained by injecting into a closed mold cavity a reaction mixture at a packing factor of 1.03 to 1.9 wherein the mold cavity has a reduced pressure of 300 to 950 mbar and the reaction mixture comprises:
   A) an organic polyisocyanate;
   B) a physical blowing agent present in an amount from 10 to 30 weight percent of the polyol composition wherein the blowing agent is a hydrocarbon selected from n-pentane, iso-pentane, cyclopentane, n-butane, cyclohexane or a mixture thereof,
   C) a polyol composition containing at least one polyol with a functionality of 3 or greater and a hydroxyl number between 300 and 800
   D) water present at 0.1 to 2.5 weight percent of the total polyol formulation;
   E) catalyst and
   F) auxiliary substances and/or additives.

2. The process of claim 1 wherein the mold cavity has an initial pressure of 500 to 850 mbar.

3. The process of claim 1 wherein the packing factor is from 1.1 to 1.6.

4. The process of claim 1 wherein the isocyanate index is 105 to 125.

5. The process of claim 4 wherein the organic polyisocyanate is an aromatic polyisocyanate selected from 4,4'-, 2,4'- and 2,2'-diphenylmethane diisocyanate, polyphenyl-polymethylene polyisocyanates, 2,4- and 2,6-tolylene diisocyanates, or mixtures thereof.

6. The process of claim 5 wherein the organic polyisocyanate is a mixture of diphenylmethane diisocyanate and polyphenyl-polymethylene polyisocyanate wherein the diphenylmethane diisocyanate isomer content is from 30 to 60 percent by weight of the polyisocyanate.

7. The process of claim 1 wherein the produced foam has a lambda of 19 to 20 mW/m.K.

8. The process of claim 1 wherein the demold time is less than 6 minutes.

9. The process of claim 1 wherein the demold time is less than 5 minutes.

10. The process of claim 1 wherein the polyol composition has a viscosity of 1000 mPa.s at 25° C.

11. The process of claim 1 wherein the polyol composition contains at least one polyol prepared by anionic polyaddition of at least one alkylene oxide onto at least one aromatic initiator molecule containing an amine.

12. process of claim 11 wherein the initiator is selected from aromatic polycarboxylic acids, aromatic hydrocarboxylic acids and aromatic aminocarboxylic acids, aromatic mono- and polyamines, condensates of phenols, formaldehyde and optionally dialkanolamines, or a mixture thereof.

13. The process of claim 11 wherein the initiator molecule is an aromatic polyamine selected from 1,2- 1,3- and 1,4-phenylenediamine, 1,3-, 2,4-, 3,4-and 2,6-tolylenediamines, 4,4'-, 2,4'- and 2,2-diaminodiphenylmethane, polypehnyl-polymethylene-polyamines, and mixtures thereof.

14. The foam process of claim 13 wherein the aromatic amine initiated polyol comprises from 10 to 60 wt percent of the polyol composition.

* * * * *